United States Patent
Ritter

(10) Patent No.: US 6,836,648 B1
(45) Date of Patent: Dec. 28, 2004

(54) RECEIVING APPARATUS FOR ELECTROMAGNETIC SIGNALS

(75) Inventor: Kai-Uwe Ritter, Bavaria (DE)

(73) Assignee: Lucent Technologies Inc., Murray Hill, NJ (US)

( * ) Notice: Subject to any disclaimer, the term of this patent is extended or adjusted under 35 U.S.C. 154(b) by 770 days.

(21) Appl. No.: 09/723,156

(22) Filed: Nov. 27, 2000

(30) Foreign Application Priority Data

Nov. 30, 1999 (EP) .............................. 99309580

(51) Int. Cl.[7] .............................. H04B 1/06; H04B 7/00; H04B 1/18
(52) U.S. Cl. .............................. 455/277.1; 455/188.1; 375/335
(58) Field of Search .............................. 455/277.1, 272, 455/266, 188.1, 189.1, 190.1, 196.1, 142.1; 375/316, 324, 335

(56) References Cited

U.S. PATENT DOCUMENTS

| | | | |
|---|---|---|---|
| 5,471,652 A | * 11/1995 | Hulkko | .......................... 455/76 |
| 5,982,819 A | * 11/1999 | Womack et al. | ............ 375/316 |
| 6,069,923 A | * 5/2000 | Ostman et al. | .............. 375/316 |
| 6,072,996 A | * 6/2000 | Smith | ....................... 455/189.1 |
| 6,359,940 B1 | * 3/2002 | Ciccarelli et al. | ............ 375/316 |

FOREIGN PATENT DOCUMENTS

| | | | |
|---|---|---|---|
| EP | 0 818 936 A2 | 1/1998 | ............ H04Q/7/30 |
| WO | WO 99/45654 | 9/1999 | ............ H04B/1/40 |

OTHER PUBLICATIONS

European Search Report, dated Apr. 26, 2000.

* cited by examiner

*Primary Examiner*—Quochien B. Vuong
*Assistant Examiner*—Edan Orgad

(57) ABSTRACT

The invention provides an apparatus for receiving electromagnetic signals with an improved capability to trace free or occupied channels. The invention comprises an assembly having a first frequency filter for filtering frequencies in a reception channel, when the apparatus is in the reception mode, or for testing one or more transmission channels, when the apparatus is in the tracing mode. The invention furthermore comprises a second frequency filter and a first switch for optional selection of the transmission or reception band. The change from the reception mode to the tracing mode is carried out, for example, by means of switches, and the bandwidth of the tuning of the oscillator, which provides a reference frequency by means of which the received signals are converted to an intermediate frequency, is reduced. This allows a particularly fast changeover.

17 Claims, 3 Drawing Sheets

# RECEIVING APPARATUS FOR ELECTROMAGNETIC SIGNALS

CROSS-REFERENCE TO RELATED APPLICATION

This application claims priority of European Patent Application No. 99309580.1, which was filed on Nov. 30, 1999.

BRIEF DESCRIPTION OF THE RELATED ART

The invention relates to an apparatus for receiving electromagnetic signals, with the capability for tracing free or occupied radio connecting channels, and to a method which can be used, in particular, with the apparatus.

In the course of a continuously increasing need for communication and mobility, transmission techniques using electromagnetic signals are of particular interest. The rapidly expanding field of mobile radio which normally operates in the Global System for Mobile Communications Standard (GSM), represents an important application of such transmission techniques. So-called base stations are used as connecting nodes in order to set up a connection between two mobile radio subscribers or one mobile radio subscriber and a communication subscriber in the fixed network. In order to ensure that simultaneous transmission and reception are guaranteed at all times on an existing connection the GSM Standard provides separate frequency bands for transmitting and receiving the electromagnetic signals. For example, base stations using the GSM900 Standard transmit in the 925 to 960 MHz frequency band, and receive in the 880 to 915 MHz frequency band. Base stations are typically split into a transmission path and a reception path, for this purpose. Each frequency band is, furthermore, split into a number of channels, which typically have a width of about 200 kHz. Relatively large base stations (so-called macro base stations), as are used to cover large regions, use a predetermined frequency plan in order to avoid simultaneous and interfering use of the same channel by two base stations located close to one another or two transmission/reception cells within the same base station.

Furthermore, the increased use of mobile radio systems within buildings has resulted in a requirement for simple, small and cheap base stations, in order to ensure network coverage without any gaps. For this purpose, a plurality of such base stations, so-called "pico base, stations" which typically have a transmission power of about 100 mW, are used in the building. In order to avoid the complex, predetermined frequency plan, pico base stations frequently have a device for scanning the transmission channels in order to find a free channel, on which it is then possible to transmit, before setting up a radio link to, for example, a mobile radio telephone. Normally, this also ensures that a free reception channel is available, since the channels from the transmission band and reception band are associated with one another in pairs. In this case, the separation between the pairs of associated transmission and reception channels is the same for all the channels used.

A known receiving apparatus having a scanning capability for the GSM900 Standard contains a mixer, which converts received signals to an intermediate frequency of, for example, 45 MHz by means of an oscillator frequency. In the reception mode, the oscillator is tuned to a frequency that is 45 MHz higher than the received frequency, in order to produce a sideband at the intermediate frequency by heterodyning with the received frequency. The signals at this intermediate frequency are then filtered by means of a bandpass filter, which has a bandwidth of one channel width, and, in the reception mode, are passed to a receiver. In the scanning mode, the oscillator tuning is varied and the measurement is carried out at the receiver to determine whether the respectively scanned frequency is, for example, occupied by another base station. In this concept, in the reception mode, the oscillator thus operates in the frequency range from 925 MHz to 960 MHz and, correspondingly in tracing mode, operates in the frequency range from 970 MHz to 1005 MHz, since the signals at the transmission frequency are also converted to the intermediate frequency. In consequence, the oscillator disadvantageously has to cover the entire frequency range from 925 MHz to 1005 MHz, that is to say has to have a bandwidth of 80 MHz, even though a bandwidth of only 35 MHz is required to cover the reception band in the GSM900 concept. This oscillator bandwidth, which is increased by a factor of about 2.3, has a disadvantageous effect on its noise characteristics.

Furthermore, when changing from the reception mode to the scanning mode or vice versa, the oscillator is tuned through 45 MHz in order to test the transmission channel associated with the reception channel for freedom or occupancy and this, disadvantageously, takes a relatively long time of, typically, 1 to 2 ms.

Furthermore, it is disadvantageous that the filter bandwidth for scanning and reception cannot be chosen independently of one another, that is to say, in particular, only one transmission channel can be tested at a time.

SUMMARY OF THE INVENTION

The invention is thus based on the object of providing an apparatus for receiving electromagnetic signals with an improved capability for tracing free or occupied channels and which allows, in particular, a fast changeover from the reception mode to the tracing mode, and vice versa.

The object is achieved in a surprisingly simple manner just by the features of claim 1 or 17. Advantageous developments of the invention are the subject matter of the dependent claims.

The apparatus comprises an antenna for receiving electromagnetic signals, and a selection device, for example a diplexer, using which predetermined frequency ranges can be selected. The selection device is associated with the antenna, in order to receive the signals from it. The apparatus furthermore comprises a frequency converter, preferably a mixer, which is associated with the selection device. Furthermore, a device which provides a reference frequency is associated with the frequency converter, which device comprises, for example, an oscillator which is preferably stabilized by a PLL circuit. The oscillator can, in particular, be tuned, such that the frequency of the received signals can be converted to a defined intermediate frequency. The apparatus also comprises an assembly, preferably a filter assembly, which contains a first frequency filter which defines a first and a second frequency range. In consequence, the bandwidth required for tuning the oscillator when switching over from the reception mode to the tracing mode is advantageously reduced. The first frequency filter in this case preferably comprises a first and a second filter, for example bandpass filters. Furthermore, the apparatus comprises a receiving device for the signals, which receiving device comprises, for example, a demodulator for demodulating the signals. The pass band of the first filter is preferably matched to the intermediate frequency, and the pass band of the second filter is matched to the difference between the intermediate frequency and the separation between associated transmission and reception channels. In this advantageous refinement of the invention, the oscillator is tuned such that frequencies of a defined reception channel are converted to the intermediate frequency, and thus essentially fall in the pass band of the first filter, in which case the second filter is matched to the associated transmission channel for the same oscillator frequency. In consequence, there is advantageously no need to retune the oscillator when changing between the reception and tracing mode, in order to test the associated transmission channel for freedom or occupancy.

In one particular embodiment, the intermediate frequency is equal to the separation between associated transmission and reception channels. In this embodiment, a direct conversion takes place in the tracing mode, since the reference frequency is approximately equal to the mid-frequency of the corresponding transmission channel.

The selection device preferably comprises a second frequency filter which is defined, for example, by a third and a fourth filter and comprises, for example, a first switch. The third and the fourth filter are preferably in the form of bandpass filters and are matched to the reception and transmission band, respectively, preferably in accordance with the GSM Standard. When the apparatus is in the reception mode, the signals are passed via the third and first filters from the antenna to the receiving device. For this purpose, the oscillator is tuned to a frequency which corresponds to the sum of the frequency of the reception channel and the intermediate frequency, in order to convert the received frequency to the intermediate frequency. When the apparatus is in the tracing mode, the signals are essentially fed via the fourth and second filters from the antenna to a meter, by means of which the field strength of the received signals can be measured.

An oscillator frequency range which is less than that for the prior art, and with the width of the reception band, is preferably advantageously sufficient.

Furthermore, the bandwidths of the first and second filters can be matched independently of one another, according to the invention, this being a further advantage. It is particularly advantageous to choose the width of the frequency band of the second filter such that a plurality of channels are covered.

The changeover process advantageously requires only a short time since, preferably, no retuning of the oscillator takes place. In this case, it is particularly advantageous to choose the width of the frequency band of the second filter such that three channels are covered at the same time. It is thus possible to determine in one step whether the corresponding transmission channel and the lower and upper adjacent channels are free. This is particularly advantageous since the adjacent channels are also preferably kept free, in order to transmit without interference.

The receiving device is preferably associated with the first filter, and the apparatus comprises a meter by means of which the field strength of the received signals can essentially be measured, and which apparatus is associated with the second filter. The bandwidth for the first filter is preferably essentially one channel width, so that signals in the defined channel are received from the reception band. By switching the selection device over from the third to the fourth filter, the apparatus is tuned to the transmission channel associated with the previously received channel, without having to retune the oscillator. In this state, the meter can measure the signal level of the associated transmission channel and, preferably, of the adjacent channels.

After a very short time, in particular less than 500 μs, the first switch can be switched back to the third filter again, in order to change to the reception mode once again.

In an alternative development of the invention, the assembly comprises a second switch, which defines a first and a second state. One connection of the switch is in each case connected to the receiving device, to the first filter and to the second filter, so that the receiving device is connected to the first filter when the switch is in the first state, and the receiving device is connected to the second filter when the switch is in the second state. In the receiving mode, the first and second switches are each in the first state, so that signals from the reception band are received by the receiving device via the third and first filters. In order to switch over to the tracing mode, the first and second switches are both changed to the second state, preferably at the same time, so that the receiver receives signals in the transmission band via the fourth and second filters. The receiver preferably has an output for connection of a field strength meter or field strength indicator, so that, in the tracing mode, it is possible to use this field strength meter to confirm whether the transmission channel associated with the reception channel and, preferably, its adjacent channels, are occupied. This switching process of the two switches from the respective first to the respective second states and back also advantageously requires only a very short time, since the oscillator need not necessarily be retuned in this case either.

With respect to the GSM Standard, the time is divided into time intervals, so-called time slots of about 500 μs, so that it is advantageously possible while a radio connection is in existence to change from the reception mode to the tracing mode and back, if a time interval is not occupied, since the changeover process advantageously lasts for a shorter time than the time interval. If a part of, or the entire, transmission band is scanned in the tracing mode, the oscillator is essentially tuned through only half the width of the transmission band so that the scanning of a plurality of channels also takes less time.

BRIEF DESCRIPTION OF THE DRAWINGS

The invention will be explained in more detail in the following text using exemplary embodiments and with reference to the drawings, in which.

DETAILED DESCRIPTION

Figure 1:
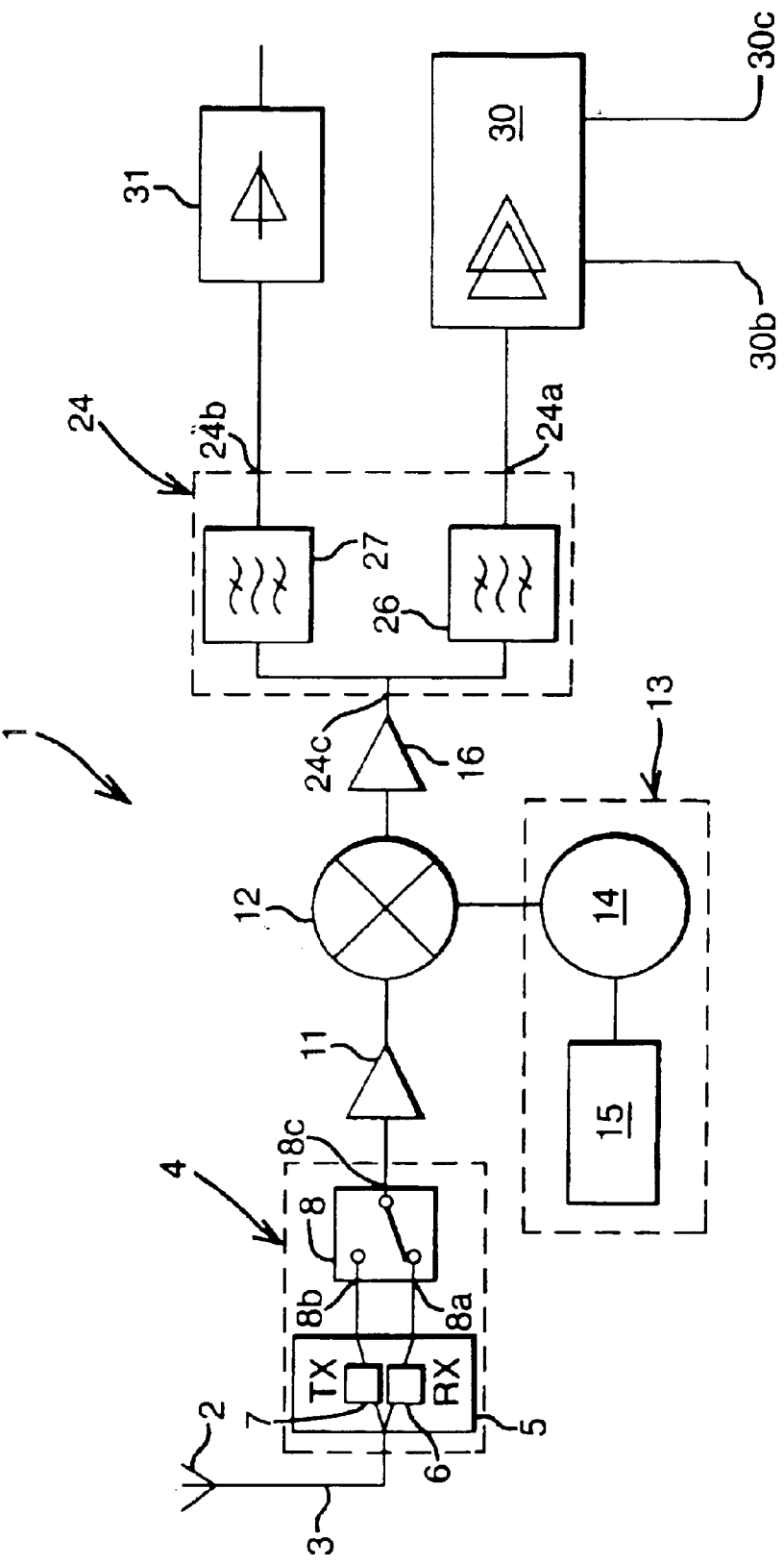
FIG. 1 shows a block diagram of a first embodiment of the invention in the reception mode.
Figure 3:
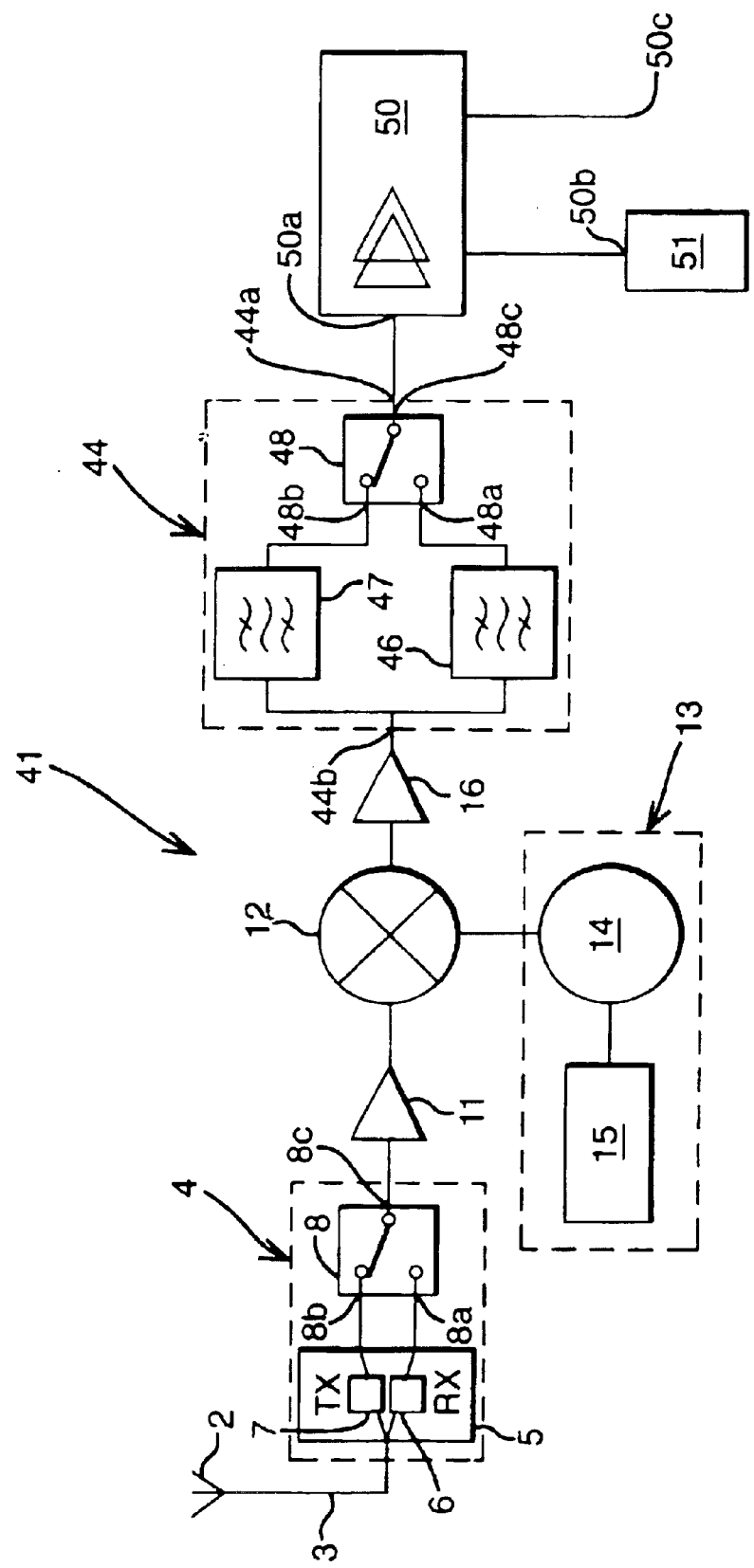
FIG. 3 shows a block diagram of the embodiment from FIG. 2 in the tracing mode.

FIG. 1 shows a receiving apparatus 1 which feeds received signals to a selection device 4 via an antenna 2 and an antenna supply line 3. The selection device 4 comprises a diplexer 5, which contains a third filter 6, a fourth filter 7 and a first switch 8. The switch comprises three connections 8a, 8b and 8c, with the switch being shown in a first state, in which the first connection 8a is connected to the third connection 8c. In a second state (see FIG. 3), the switch connects the second connection 8b to the third connection 8c. The third filter 6 of the diplexer 5 is matched to the GSM900 reception band, and has a pass band from about 880 MHz to 915 MHz. The second filter 7 of the diplexer 5 is matched to the GSM900 transmission band, and has a pass band from about 925 MHz to 960 MHz. In consequence, received signals within the reception band are passed onto a first amplifier 11, provided the first switch 8 is in the first state. If the first switch 8 is in the second state, then signals within the transmission band are passed to the amplifier 11. The signals which have been intermediately amplified in such a way are passed from the amplifier 11 to a mixer 12, in which a reference frequency is heterodyned on them. The reference frequency is provided for the mixer 12 from a PLL-stabilized oscillator assembly 13, which comprises an oscillator 14 and a PLL synthesizer 15. The signal, which is mixed with the reference frequency in the mixer 12, is amplified once again in a further amplifier, in order to be passed on from this amplifier to an assembly 24. The filter assembly 24 comprises a first, second and third connection 24a, 24b and 24c, respectively, as well as a first and second bandpass filter 26 and 27, respectively. The first bandpass filter 26 defines a first frequency range, to be more precise it has a mid-frequency of about 45 MHz and a bandwidth of essentially one channel. The second bandpass filter 27 defines a second frequency range, to be more precise a pass band which extends from about 10 to 100 kHz. If the first switch 8 is in the first state, the receiving apparatus 1 operates in the reception mode. If, for example, the carrier frequency 900 MHz is received on one channel, then the oscillator 14 is tuned to a frequency of 945 MHz. This results in a sideband of an intermediate frequency at 45 MHz in the mixer. The signals which have been converted to the intermediate frequency of 45 MHz can pass through the first filter 26 and are fed from the first connection 24a of the filter assembly 24 to a phase demodulator 30. The demodulated signal is present at the third connection 30c of the phase demodulator 30. The field strength of the received signal is present at a second connection 30b of the phase demodulator 30, and can be measured by a field strength indicator.

If the first switch is in the second state, then the amplifier 11 receives signals in the transmission band from 925 to 960 MHz via the fourth filter 7, the connection 8b and the connection 8c of the switch 8. These signals are mixed in the mixer 12 with the same oscillator frequency as in the reception mode described above, and are then amplified by the amplifier 16. The transmission channel associated with the reception channel is at a frequency that is 45 MHz higher, and the oscillator frequency therefore corresponds to the mid-frequency of the associated transmission channel, and direct conversion is thus carried out in the mixer. The second filter 27 has a pass band from 10 to 300 kHz, by which means the transmission-channel corresponding to the reception channel, and its left and right adjacent channels, are covered. In direct conversion, the upper cut-off frequency of the second filter corresponds to half the width of the frequency range to be measured. Frequencies from 0 to 10 kHz are cut off merely to suppress direct currents, and this means a range of ±10 kHz around the centre of the corresponding transmission channel. However, this does not mean any significant functional limitation, since only the field strength of the received signal is determined by means of the field strength indicator 31 via the second connection 24b of the frequency filter 24.

If the reception apparatus 1 is in the reception mode and receives, for example, signals in a reception channel, it is possible simply by changing the switch 8 from the first to the second state, that is to say from the reception mode to the tracing mode, to confirm whether the associated transmission channel and its left and right adjacent channels are occupied by other appliances and then, if necessary, to change the transmission and reception channels. Since no retuning of the oscillator 14 is required to do this, a very short time is sufficient to determine whether the corresponding transmission channel and its left and right adjacent channels are occupied. The changeover process from the first to the second state and back again can be carried out, for example, within a free time interval with a duration of 500 μs.

Figure 2:
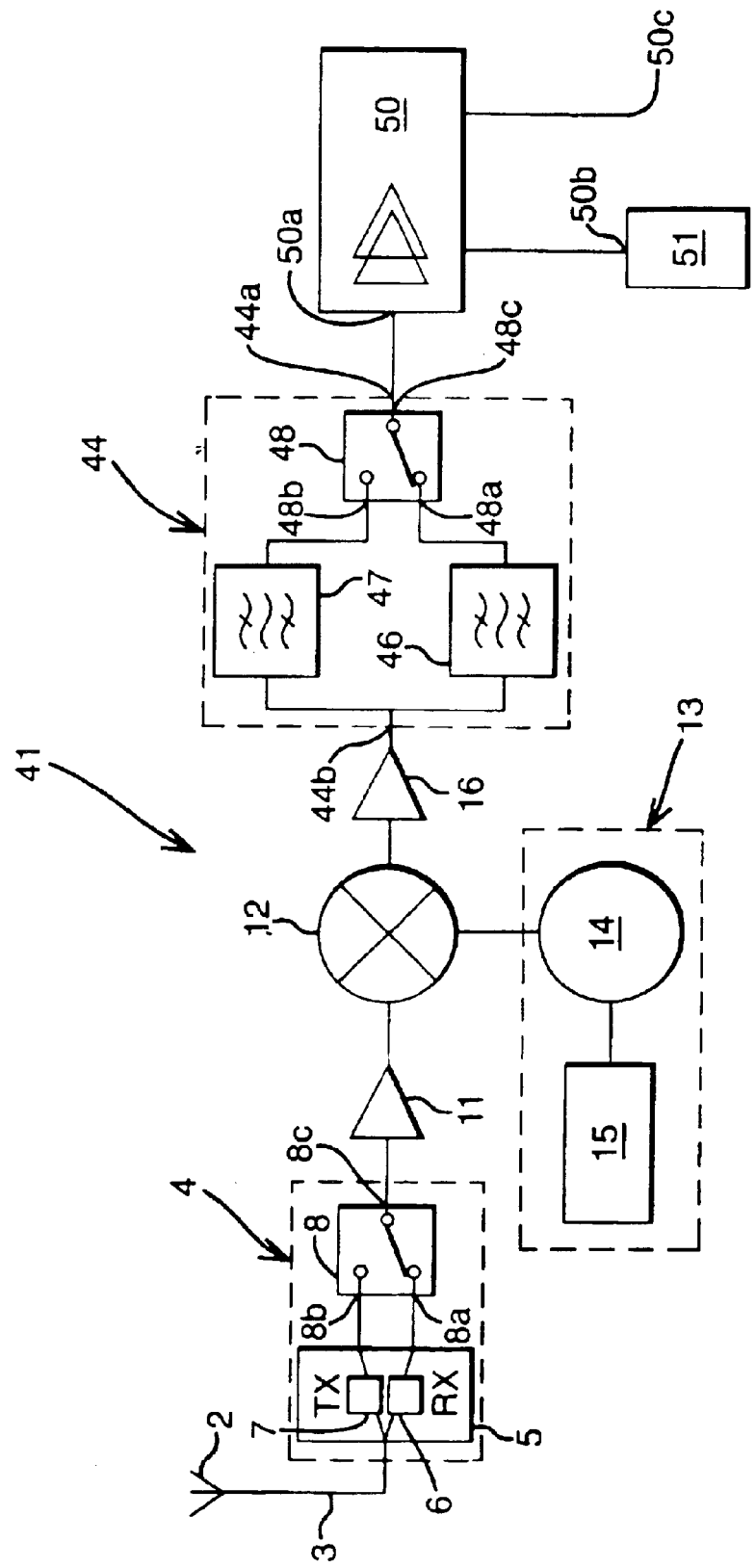
FIG. 2 shows a block diagram of a second embodiment of the invention in the reception mode.

The embodiment illustrated in FIG. 2 differs from the embodiment illustrated in FIG. 1 essentially by having a modified filter assembly 44 and the downstream receiving and tracing components. Identical components are thus denoted by the same reference symbols as in FIG. 1. These are, in particular, the antenna 2, the antenna supply line 3, the selection device 4, the second frequency filter 5, the third filter 6, the fourth filter 7, the first switch 8, the two amplifiers 11 and 16, the mixer 12 and the PLL-stabilized oscillator assembly 13. The signals which are then amplified by the amplifier 16 are passed onto a second connection 44b of the filter assembly 44. The filter assembly 44 contains a first filter 46, which has a pass band of 45 MHz±100 kHz, and a second filter 47, which has a pass band from 10 to 300 kHz. The first filter 46 is connected to a first connection 48a of a second switch 48, and the second filter 47 is connected via a first connection 44a of the filter assembly 44 to a second connection 48b of the second switch 48. A third connection 48c of the switch 48 is connected to an input 50a of a demodulator 50. A meter 51 is connected to a first output 50b of the demodulator, and determines the field strength of the received signals. The phase-demodulated received signal is present at a second output 50c of the demodulator 50. The switch 48 defines a first state if the first and third connections 48a and 48c, respectively, are connected, and a second state if the second and third connections 48b and 48c, respectively, are connected to one another.

When the reception apparatus 41 is in the reception mode, the first and second switches 8 and 48, respectively, are both in the first state (shown in FIG. 2). The selection device 4 thus allows signals in the reception band from 880 to 915 MHz to pass via the third filter 6 and the first switch 8, and these signals are mixed with the reference frequency from the oscillator 14, in the mixer 12, after intermediate amplification in the amplifier 11. The oscillator is at a frequency which corresponds to the sum of the frequencies of the channel to be received and the intermediate frequency of 45 MHz. The mixed signals are then amplified by the second amplifier 16, and are passed onto the second connection 44b of the filter assembly 44. The reception channel signals which have been converted to the intermediate frequency of 45 MHz pass through the first filter 46 and the second switch 48, which is in the first state. From the third connection 48c of the second switch 48, the received signals pass to the input 50a of the demodulator 50. The received signals are demodulated by the demodulator 50, and are present at the second output 50c of the demodulator 50. The field strength indicator 51 measures the field strength of the received signals at the first output 50b of the demodulator 50. In the tracing mode, the first and second switches 8 and 48, respectively, are each in the second state (illustrated in FIG. 3). In consequence, received signals within the transmission band from 925 to 960 MHz pass via the fourth filter 7 and the first switch 8, and onwards via the amplifier 11 to the mixer 12. The oscillator 14 is not retuned in comparison with the reception mode described above, since the reference frequency set for reception in a specific reception channel is suitable for tracing the associated transmission channel. This means that the corresponding transmission channel and its left and right adjacent channels pass via the amplifier 16, through the second filter 47, to the second connection 48b of the second switch, and from there via the third connection 48c of the second switch and the first connection of the filter assembly to the input 50a of the demodulator 50. The signal field strength at the first output 50b of the demodulator 50 is determined by means of a field strength indicator 51. With the filter pass bands chosen in this exemplary embodiment, signals within the transmission channel associated with the reception channel are converted directly.

In the receiving apparatus 41, the change from the reception mode to the tracing mode is carried out essentially by simultaneously switching the first and second switches 8 and 48, respectively, from the respective first state to the respective second state. In this case as well, there is no need to measure the signal field strength of the transmission channel associated with the reception channel, and of its adjacent channels, in order to retune the oscillator. The change from the reception mode to the tracing mode and back again thus once again requires only a short time in this second embodiment, and can be carried out, for example, within a transmission pause of 500 µs.

It is evident to a person skilled in the art that the invention is not limited to the described embodiments and, in particular, the frequency ranges of the first and second frequency filters can be matched to the respective requirements. In particular, the intermediate frequency, and thus the pass band of the respective first filter 26, 46, can be matched to the frequencies which actually arise, preferably to the separation between corresponding reception and transmission channels. The concept of direct conversion for the tracing mode is not a necessary feature of the invention either, but only a preferred embodiment. In the same way, the width of the pass band of the respective second filters 27, 47 may be chosen freely and, in particular, independently of the bandwidth of the first filters 26, 46, so that the field strength of a number of transmission channels, which can be chosen freely, can be determined at the same time. The first and second filters may also be chosen such that tuning of the oscillator when changing from the reception mode to the tracing mode is worthwhile, or even necessary.

Furthermore, using the receiving apparatus according to the invention in the tracing mode, it is possible to scan a part or the entire transmission band, which means only tuning the oscillator through 35 MHz even for complete scanning.

What is claimed is:

1. An apparatus for receiving electromagnetic signals, comprising:
   an antenna,
   a selection device for definition of predetermined frequency ranges, with the selection device being associated with the antenna,
   a frequency converter by means of which the frequency of the received signals can be converted to an intermediate frequency and which is associated with the selection device,
   a device which provides a reference frequency and is associated with the frequency converter
   an assembly which is associated with the frequency converter, the assembly comprises a first frequency filter, which defines a first and a second frequency range, in which the first frequency range is matched to the intermediate frequency and the second frequency range is matched to the difference between the intermediate frequency and the separation between the associated transmission and reception channels and
   a receiving device which is associated with the assembly.

2. The apparatus according to claim 1, in which the first frequency filter comprises a first and a second filter, with which the first and the second frequency range, respectively, are associated.

3. The apparatus according to claim 2, in which the first and/or second filter are bandpass filters.

4. The apparatus according to claim 1, 2 or 3, in which the width of the second frequency range is matched such that three channels are covered at the same time.

5. The apparatus according to claim 1, 2, or 3, in which the intermediate frequency is essentially equal to the separation between two associated transmission and reception channels.

6. The apparatus according to claim 1, 2 or 3, in which the selection device comprises a second frequency filter, which is preferably defined by a third and a fourth filter and which preferably comprises a first switch.

7. The apparatus according to claim 6, in which the third and the fourth filter are associated with a reception and transmission band, respectively, preferably in accordance with GSM Standard.

8. The apparatus according to claim 1, 2 or 3, in which the selection device comprises a bandpass filter and/or a high-pass filter and/or a low-pass filter.

9. The apparatus according to claim 1, 2 or 3, in which the device which provides a reference frequency comprises an oscillator and/or a PLL stabilization device.

10. The apparatus according to claim 1, 2, or 3, which comprises an amplifier between the selection device and the frequency converter and/or an amplifier between the frequency converter and the assembly.

11. The apparatus according to claim 1, 2 or 3, in which the receiving device is associated with the first filter, and which apparatus comprises a field strength meter for the received signals.

12. apparatus according to claim 1, 2 or 3, in which the assembly comprises a second switch.

13. The apparatus according to claim 12, in which a first and a second connection of the second switch are associated with the first and the second filter respectively, and a third connection of the second switch is associated with the receiving device so that the receiving device is connected to the first filter when the second switch is in a first state, and the receiving device is connected to the second filter when the second switch is in a second state.

14. The apparatus according to claim 1, 2 or 3, which comprises a field strength meter for the received signals, which is associated with the receiving device.

15. A method for testing the freedom or occupancy of radio connecting channels,
   in which a first switch is switched from a first state, in which a receiving apparatus receives electromagnetic signals via a third and a first filter, to a second state, in which a field strength meter receives signals via a fourth and a second filter, and
   after a predetermined time, is switched back from the second state to the first state without the onward switching and/or backward switching, changing a reference frequency for converting the signals to an intermediate frequency in a defined manner.

16. A method for testing the freedom or occupancy of radio connecting channels,
   in which a first and a second switch are each switched, essentially at the same time, from a first state, in which a receiving apparatus receives electromagnetic signals via a third and a first filter, to a second state, in which the receiving apparatus receives signals via a fourth and a second filter, and
   after a predetermined time, are in each case switched back from the second state to the first state, essentially at the same time, without the onward switching and/or backward switching, changing a reference frequency for converting the signals to an intermediate frequency in a defined manner.

17. The method according to claim 15 or 16, in which the onward and backward switching of the first and/or second switch takes place essentially during a reception pause.

* * * * *